(12) United States Patent
Pillman et al.

(10) Patent No.: US 8,228,418 B2
(45) Date of Patent: Jul. 24, 2012

(54) ANTI-ALIASING SPATIAL FILTER SYSTEM

(75) Inventors: Bruce H. Pillman, Rochester, NY (US);
Russell J. Palum, Rochester, NY (US);
John N. Border, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 707 days.

(21) Appl. No.: 12/407,836

(22) Filed: Mar. 20, 2009

(65) Prior Publication Data
US 2010/0238328 A1 Sep. 23, 2010

(51) Int. Cl.
*H04N 5/225* (2006.01)
(52) U.S. Cl. ........................................ 348/342
(58) Field of Classification Search ............... 348/342
See application file for complete search history.

(56) References Cited

U.S. PATENT DOCUMENTS

| | | | |
|---|---|---|---|
| 4,101,929 A | 7/1978 | Ohneda | |
| 4,190,330 A | 2/1980 | Berreman | |
| 4,572,616 A * | 2/1986 | Kowel et al. | 349/200 |
| 4,896,217 A | 1/1990 | Miyazawa et al. | |
| 6,040,857 A * | 3/2000 | Hirsh et al. | 348/241 |
| 6,326,998 B1 * | 12/2001 | Palum | 348/342 |
| 6,973,264 B2 * | 12/2005 | Iwane | 396/111 |
| 7,184,138 B1 * | 2/2007 | Li | 356/237.2 |
| 2003/0219237 A1 * | 11/2003 | Bastasz et al. | 386/128 |
| 2007/0229754 A1 * | 10/2007 | Galstian et al. | 349/200 |

OTHER PUBLICATIONS

Pishnyak et al, Electrically Tunable Lens Based on a Dual-Frequency Nematic Liquid Crystal, Appl. Optics, vol. 45, No. 19, Jul. 2006, pp. 4576-4582.
Hallstig, Nematic Liquid Crystal Spatial Light Modulators for Laser Beam Steering, Uppsala University, Acta Universitatis Uppsaliesis, Comprehensive Summaries of Uppsala Dissertations, 1048, 71 pgs. ISBN 91-554-6110-7.

* cited by examiner

*Primary Examiner* — Clayton E LaBalle
*Assistant Examiner* — Dennis Hancock
(74) *Attorney, Agent, or Firm* — Raymond L. Owens (57) ABSTRACT

A sensor module for an image capture device including an image sensor and a filter system, the image capture device having a high resolution mode of operation and one or more lower resolution modes of operation; the filter system includes an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation.

5 Claims, 9 Drawing Sheets

ANTI-ALIASING SPATIAL FILTER SYSTEM

CROSS REFERENCE TO RELATED APPLICATION

Reference is made to commonly assigned U.S. patent application Ser. No. 11/872,897 filed Oct. 16, 2007, entitled "Anti-Aliasing Spatial Filter System" by Kelly et al, the disclosure of which is incorporated herein.

FIELD OF THE INVENTION

This invention relates generally to the field of digital motion and still photography and, more particularly, to anti-aliasing for imaging systems that have a plurality of resolution modes.

BACKGROUND OF THE INVENTION

An electronic imaging system typically produces a signal output corresponding to a viewed object by spatially sampling an image of the object in a regular pattern with an array of photosensitive elements, such as, for example, a charge-coupled device (CCD) or Complementary Metal-Oxide Semiconductor (CMOS) solid-state image sensor. In such an imaging system, it is well known that components in the object field that contain fine details can create spatial frequencies too high to be captured in the image without sampling error within the sampling interval of the sensor. These details can produce lower frequency components, resulting in imaging errors commonly referred to as aliasing or undersampling artifacts. Aliasing is related to the system modulation transfer function (MTF) and, in a more pronounced manner, to the spatial periodicity of the photo sites or "pixels" of the solid-state imaging array. In particular, if the spatial detail that is being imaged contains a high frequency component of a periodicity greater than twice the pitch of the photo sites or pixels of the image sensor, the undesirable effect of this high frequency component can be a spurious signal due to aliasing. As is familiar to those skilled in the digital imaging arts, the particular frequency above which aliasing is likely is termed the Nyquist frequency.

In general, the electronic imaging system can reduce aliasing if its optical section has a frequency response that cuts off, or filters out, the higher frequency content of the object being imaged, that is, frequencies above the Nyquist frequency. As a result, the optical section generally employs an optical low pass spatial filter to substantially reduce the high frequency component contained in the spatial detail of the image received by the image sensor. Thus, conventional design of electronic imaging systems involves a trade-off between image sharpness, which increases with higher frequency image content, and compensation for aliasing distortions or undersampling artifacts, which reduces higher frequency image content.

To limit aliasing artifacts, an optical spatial filter, for example, a birefringent anti-aliasing filter (also known as a blur filter), has become a common component in consumer color video cameras. For example, U.S. Pat. Nos. 4,101,929 to Plummer and 4,896,217 to Miyazawa et al. show typical examples of anti-aliasing filters. Such a filter is usually placed between a lens and the image sensor in order to provide a low-pass spatial filter function, reducing the spatial frequency content of the image at frequencies above the Nyquist frequency of the image sensor. This use of an anti-aliasing filter makes the imaging system less susceptible to aliasing distortion. An excellent discussion of aliasing and the use of anti-aliasing filters is presented in U.S. Pat. No. 6,040,857 by Hirsch et al. Another less desirable option to reduce aliasing would be to use a lens with lower MTF at high frequency or a higher f/# lens to blur the image. However, this approach leads to less sharpness in the image or f/# dependent blur and is not a favorable solution for image anti-aliasing.

Recently, image sensors having the ability to image in multiple resolution modes have been commercialized. This innovation in imaging technology allows a single image sensor to have both a high-resolution mode, obtaining a digital image data value from each individual pixel, and one or more lower-resolution modes, in which charge from multiple pixels can be summed together electrically on the image sensor in a process known as binning, thereby reducing the amount of data obtained and effectively obtaining information from fewer, "larger" pixels. Other methods to produce effectively larger pixels include summing pixel values digitally or summing the voltage associated with each pixel and possibly other techniques. In some lower resolution modes such as for the preview images, a sparse sampling of the pixels is used where some of the pixels on the image sensor are not used. Combinations of the various methods are also possible such as a sparse readout of binned pixels that are later summed. Each resolution mode, then, has different sampling characteristics but works with a lens having the same MTF. As the resolution of the image sensor decreases in lower resolution modes, due to increases in the effective size or pitch of the pixels or a decreases in the spatial sampling frequency on the image sensor, the Nyquist frequency goes down and as a result, the tendency for aliasing to occur in an image increases.

Because high-resolution and low-resolution modes require different amounts of optical blur to prevent aliasing and to preserve sharpness, compensating for aliasing with such a dual-mode system can involve a considerable amount of compromise. An anti-aliasing filter that is designed to anti-alias the image in the lowest resolution mode will excessively blur the image in a higher resolution mode. An anti-aliasing filter that is designed for the highest resolution mode will anti-alias properly for high-resolution operation, but will not effectively compensate aliasing for all appropriate frequencies in reduced resolution modes.

Thus, it can be seen that there is a need for solutions that provide anti-aliasing compensation for imaging systems that have multiple resolution modes.

SUMMARY OF THE INVENTION

Embodiments of the present invention address the need for anti-aliasing with digital imaging systems that have both high- and low-resolution modes.

In accordance with the present invention, there is provided a sensor module for an image capture device including an image sensor and a filter system, the image capture device having a high resolution mode of operation and one or more lower resolution modes of operation; the filter system comprising:

an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation.

The present invention provides a spatial filter system for an image capture device including an image sensor, the imaging capture device having a high resolution mode of operation and one or more lower resolution modes of operation; the filter system comprising:

an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation; and means for selectively applying the first signal, when the adjustable spatial filter is to be effective in the high resolution mode of operation, and the second signal when the adjustable spatial filter is to be effective in the lower resolution mode of operation.

An advantageous effect of the present invention relates to the capability to quickly adjust the adjustable spatial filter as the digital imaging system is changed between different resolution modes of operation to prevent aliasing in the image due to high spatial frequency image content.

The invention and its objects and advantages will become more apparent in the detailed description of the preferred embodiment that follows.

DETAILED DESCRIPTION OF THE INVENTION

Apparatus and methods of embodiments of the present invention provide anti-aliasing for an image capture device that can operate in a high-resolution mode of operation and in one or more lower-resolution modes. For example, the image capture device can operate in a high-resolution mode, effectively using each pixel individually on its image sensor to provide a high resolution image, and then later, the image capture device can operate in a lower-resolution mode wherein pixels are combined or subsampled so that the effective number of pixels used is reduced. High-resolution modes can be used for still image capture at the maximum sensor resolution. Lower resolution modes can be used to capture video, or to capture still images with a shorter exposure such as in a sports mode to reduce motion blur, or in a low light mode to increase signal and reduce noise. Although the other optical components of the imaging system contribute in the same way to the system MTF under high-resolution and low-resolution conditions, the image sensor can have very different characteristics, requiring different anti-aliasing compensation. As was noted earlier in the Background section, using the same anti-aliasing filter for different resolution modes would excessively compromise performance for one or both of the high-resolution and low-resolution modes.

Reducing the effective resolution of an image sensor, such as by using pixel binning or pixel summing which effectively increases the size of the pixels, or pixel subsampling which decreases the spatial frequency of the sampling of the pixels as examples, all reduce the Nyquist frequency of the image sensor, above which aliasing can occur thereby making aliasing more likely. When an image sensor can be used in either a high-resolution or a low-resolution mode, it effectively has two different Nyquist frequencies. The function of the anti-aliasing filter or low pass spatial filter is to filter out, as effectively as possible, frequency content above the Nyquist frequency and thereby reduce aliasing.

In the prior art, low pass spatial filtering to reduce aliasing is performed with various non-adjustable spatial filters (also known as blur filters), including birefringent filters such as quartz, lithium niobate and calcite, diffractive filters such as phase noise filters, and grating filters, and refractive filters such as the pyramid design. With a non-adjustable spatial filter, aliasing can be prevented above the Nyquist frequency for only one resolution of operation for a given image sensor.

However, it is now common to operate the image sensor at two or more different resolutions in different modes of operation for the image capture device. Typically a high resolution mode is used for still image capture or slow frame rate video capture. One or more, lower resolution modes are used for still image capture in either a sports mode or an anti-shake mode to enable a shorter exposure time to reduce motion blur. One or more, lower resolution modes are also used for still image capture in low light to increase signal and reduce the amount of noise in the images. A low resolution mode is also used for fast frame rate video to reduce the amount of data generated in a video. An even lower resolution mode can be used for high frame rate capture of slow motion video where the reduced resolution is necessary to reduce the rate of data generated by the high frame rate to enable the image processor to process the image data. Low resolution modes are also used to reduce the bandwidth required to transmit still or video image data. As a result of the multiple resolution modes of operation, a low pass spatial filter that can only be used for one resolution of operation does not solve the aliasing problem for all the modes of operation.

To reduce aliasing when the image capture device is operated at more then one resolution, embodiments of the present invention use an adjustable optical structure in the optical path to form an adjustable spatial filter to apply just the right amount of blur or MTF reduction for anti-aliasing in different resolution modes of an image capture device. Where, depending on the desired resolution of the image capture device in a particular mode of operation, the pixels on the image sensor can unbinned and fully sampled in a high resolution mode or in lower resolution modes the pixels can be binned or summed or subsampled with a reduced sampling frequency. In a high resolution mode, the adjustable spatial filter of the invention does not blur the image provided by the lens, thereby substantially maintaining the point spread function of the lens as measured at the image sensor. In contrast, the adjustable spatial filter of the invention blurs the image provided by the lens in lower resolution modes to increase the point spread function as measured at the image sensor as compared to the point spread function provided by the lens without the adjustable spatial filter. By blurring the image in lower resolution modes, the adjustable spatial filter of the invention increases the point spread function as measured at the image sensor to better match the point spread function to the effective size of the pixels or the spatial sampling of the pixels on the image sensor as used for the desired resolution of the image capture device.

Electro-optical devices such as liquid crystal lenses are well known in the art. Liquid crystal molecules have a different refractive index along their length compared to across the length (i.e., they are birefringent). The operating principle in a liquid crystal lens is that an applied electric field can be used to change the orientation of liquid crystal molecules and thereby change the local refractive index. So that when an applied electric field changes the orientation of the liquid crystal molecules, the refractive index experienced by light passing through the liquid crystal material is changed as well. Changes in refractive index produce changes in the optical path distance (OPD) in the liquid crystal material and it is this local change in OPD which creates an optical structure in the liquid crystal material that provides the lensing effect in a liquid crystal lens.

A liquid crystal lens with a curved electrode is described in U.S. Pat. No. 4,190,330 wherein the curved electrode produces a corresponding curved distribution in the intensity of the electric field within the liquid crystal material to produce a lens. U.S. Patent Application Publication No. 2007/0229754 describes a liquid crystal lens with a shaped dielectric layer that is used to produce different electric field distributions and associated different lens structures. An excellent discussion of a liquid crystal lens where a hole in one of the electrodes is used to form a circular electric field from fringing around the edge of the hole is presented in an article by Pishnyak, O, Sato, S, Lavrentovich, O; "Electrically Tunable Lens Based on a Dual-Frequency Nematic Liquid Crystal"; Applied Optics; Vol. 45, No. 19; July 2006, pp. 4576-4582.

Due to material limitations, the magnitude of change in refractive index seen in liquid crystal materials is limited, so that the use of liquid crystal devices to form lenses and other optical structures is limited to optical structures which have an OPD of a few microns. Where OPD is defined as shown in Equation 1

$$OPD = \Delta n * t \quad \text{Equation 1}$$

where $\Delta n$ is the change in refractive index that can be produced in the liquid crystal material (also known as the birefringence) and t is the thickness of the liquid crystal material. The speed of response of a liquid crystal device is also limited as it is proportional to the voltage applied and inversely proportional to the square of the thickness (for an excellent analysis of the performance of liquid crystal devices see a thesis by Emil Hallstig, Uppsala University, Acta Universitatis Uppsaliesis, Comprehensive Summaries of Uppsala Dissertations from the Faculty of Science and Technology, 1048, 71 pp, ISBN 91-554-6110-7). For an image capture device, the voltage is typically limited to 40 volts or less and the speed of response needed is less than 1 sec so that the thickness of the liquid crystal device is typically on the order of 40 microns or less. Further, the change in refractive index possible in liquid crystal materials is typically approximately 0.25 so that the OPD of adjustable optical structures based on Equation 1 that are possible with liquid crystal devices is 10 microns or less depending on the speed of response required.

For many mode changes in an image capture device, a speed of response of 1 sec is acceptable so that an adjustable spatial filter based on a liquid crystal device that can be adjusted for different resolution modes of operation can be 10 microns or less in thickness. One type of spatial filter that has a thin optical structure is the pyramidal filter which is described in U.S. Pat. No. 6,326,998 wherein the spatial filter has rows of pyramidal structures and the angle of the sides of the pyramids determines the resolution that the spatial filter anti-aliases at. For an example, the pyramidal anti-aliasing filter as given in U.S. Pat. No. 6,326,998 on Col 5 lines 33 to 65, for an image sensor with a 7.4 micron pitch and a lens with a 6.5 mm focal length, the angle of the pyramid facets (see FIG. 2A) is 0.065 degrees so that for a 10 mm aperture of the spatial filter, the OPD of the pyramids is 2.5 micron. The fact that the pyramidal spatial filter has optical structures that are below 10 micron in size makes it suitable for an electrically adjustable spatial filter as described by the invention.

Another spatial filter that has an optical structure that can be below 10 microns in thickness is the phase noise spatial filter. In U.S. Pat. No. 6,040,857, a phase noise anti-aliasing filter is described wherein the filter has a randomly arrange array of phase spots, and the size of the phase spots and distance from the image sensor determines the resolution that the filter anti-aliases at while the thickness of the phase spots in the phase noise spatial filter determines the wavelength that the filter will operate at. For the example given in U.S. Pat. No. 6,040,857 col 15 lines 33, the phase spot diameter for a 7 micron pixel color sensor is 313 micron. The thickness of the phase spots is given by Equation 2 (presented in Col 13 line 9)

$$t = \lambda_0 / 2(n_0 - n_0') \quad \text{Equation 2}$$

wherein t is the thickness of the phase spots, $\lambda_0$ is the wavelength of the light being designed for, $n_0$ is the refractive index of the material of the spatial filter and $n_0'$ is the refractive index of the material surrounding the phase spots. For a liquid crystal device which operates by local changes in refractive index, the thickness of the phase spots for light of 0.5 micron wavelength, refractive index 1.53 with a change in refractive index of 0.25 requires a phase spot OPD of 1.0 micron. Further, the cutoff spatial frequency $F_a(\lambda)$ (in line pairs/mm) of the phase noise anti-aliasing filter is given by Equation 3 (presented in Col 3 line 55).

$$F_a(\lambda) = a/\lambda b \quad \text{Equation 3}$$

Where a is the diameter of the phase spots and b is the distance between the phase spots and the image sensor. As shown by the 1.0 micron thickness of the phase spots for the example given, phase noise spatial filters are also suitable for making an adjustable spatial filter with a liquid crystal device.

Figure 1A:
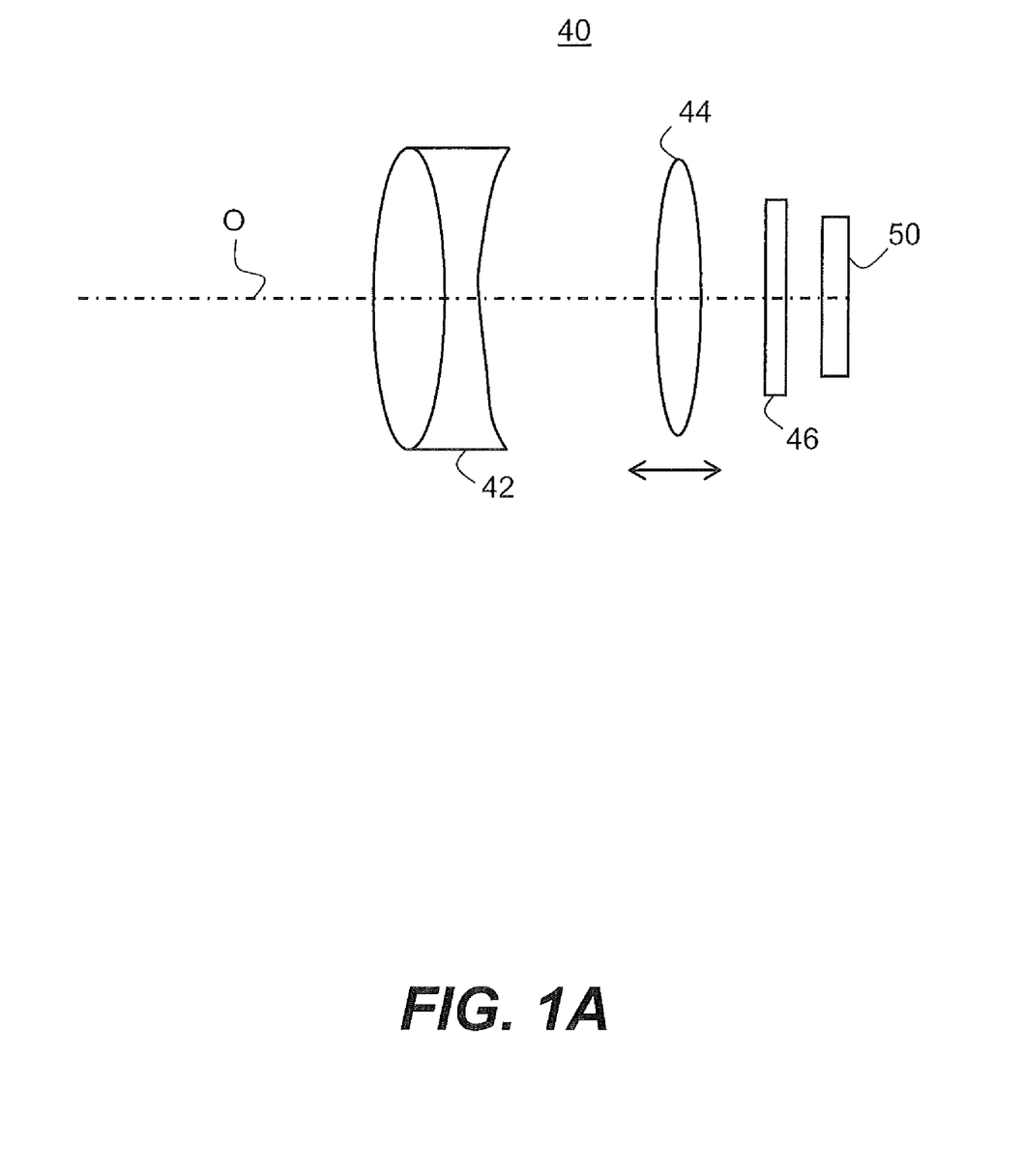
FIG. 1A is a schematic diagram of an optical system using an adjustable spatial filter positioned in the optical path.

FIG. 1A shows a schematic cross section of an optical system 40 having a lens assembly 42, a focus adjustment system 44 and an image sensor 50. The elements of the optical system 40 share a common optical axis O. An adjustable spatial filter 46 that is the subject of this invention is shown in FIG. 1 positioned directly in front of the image sensor 50. However, it is within the scope of the invention for the adjustable spatial filter 46 to be positioned at other points along the optical path O of the optical system 40 such as between the focus system 44 and the lens assembly 42 or in front (to the left) of the lens assembly 42. The lens assembly 42 can include one or more lens elements in one or more lens groups as are typically used in a photographic objective lens assembly 42. As previously stated, the function of the adjustable spatial filter 46 of the invention in a high resolution mode is to not blur the image presented by the lens assembly 42 and the focus adjustment system 44 so that the point spread function of the lens is substantially maintained. In contrast, the function of the adjustable spatial filter 46 of the invention in a lower resolution mode is to provided an appropriate level of blur so that the point spread function is increased by the adjustable spatial filter 46 so the point spread function as measured at the image sensor 50 substantially matches the effective size of the pixels or the spatial sampling of the pixels on the image sensor 50 as used in the lower resolution mode.

Figure 1B:
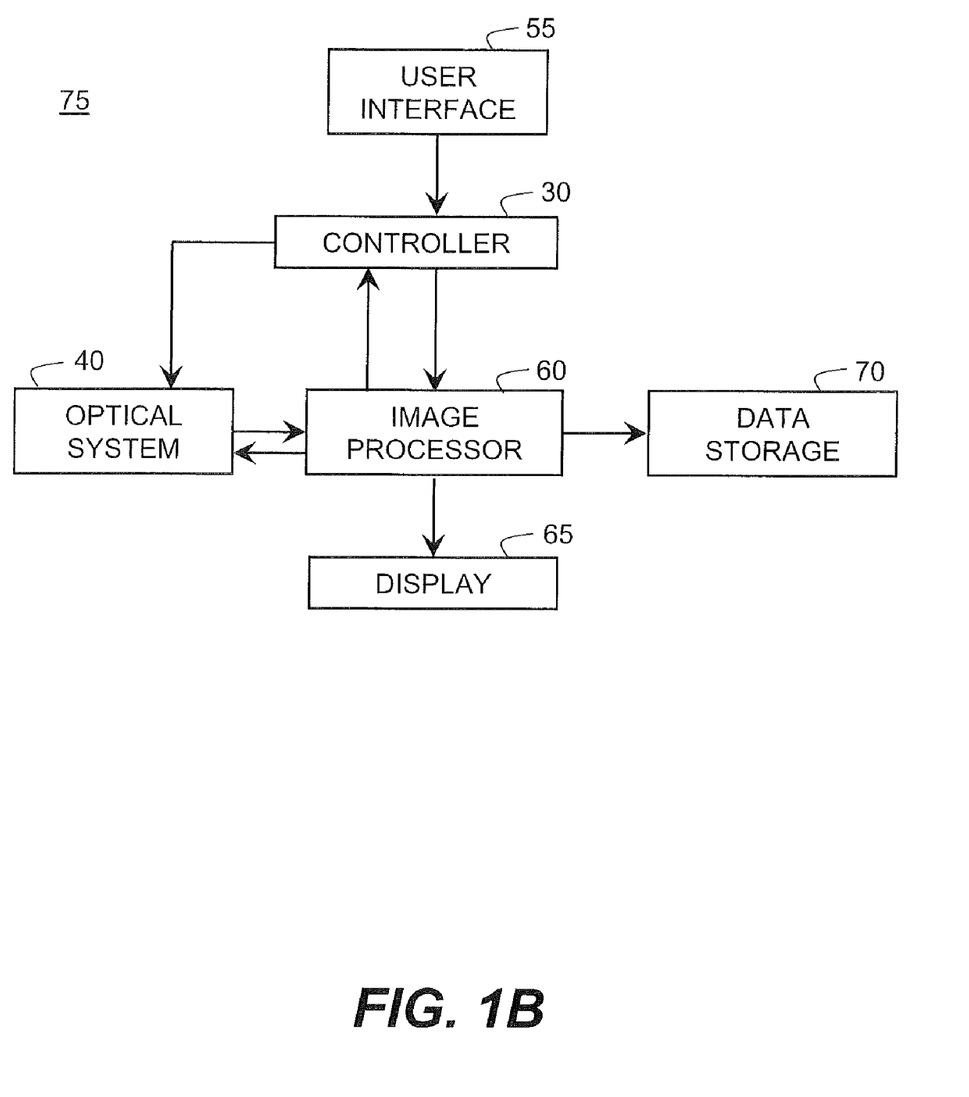
FIG. 1B is a block diagram of an image capture device.

FIG. 1B shows a block diagram of an image capture device 75 that includes the optical system 40. The image capture device 75 further includes a controller 30, a user interface 55, an image processor 60, a display 65 and data storage 70. The image capture device 75 can be a digital camera, a video camera or a cell phone camera, for example. The user interface 55 permits the user to manually select the operating mode for the image capture device 75 wherein the selection of operating mode can include the selection of resolution for the image capture device 75 and the resolution of the image sensor 50 to be operated at. Alternately, the user can select an automatic operating mode wherein the image processor 60 can select the resolution that the image capture device 75 and the image sensor 50 is to operated at based on the photographic conditions (bright/dark, motion present, still/video, or high dynamic range) present in the scene that is to be imaged. The controller 30 operates based on inputs from the user interface 55 and the image processor 60 to apply first or second (or more) signals to the adjustable spatial filter 46 thereby causing the adjustable spatial filter 46 to be effective in a high resolution mode or a lower resolution mode(s) respectively. The adjustable spatial filter 46 is adjusted so the adjustable spatial filter 46 is effective at a resolution that matches the resolution that the image sensor 50 is to be operated at thereby reducing aliasing. After the desired images have been captured, the images are processed by the image processor 60 and then displayed on the display 65 or stored in data storage 70.

Figure 2A:
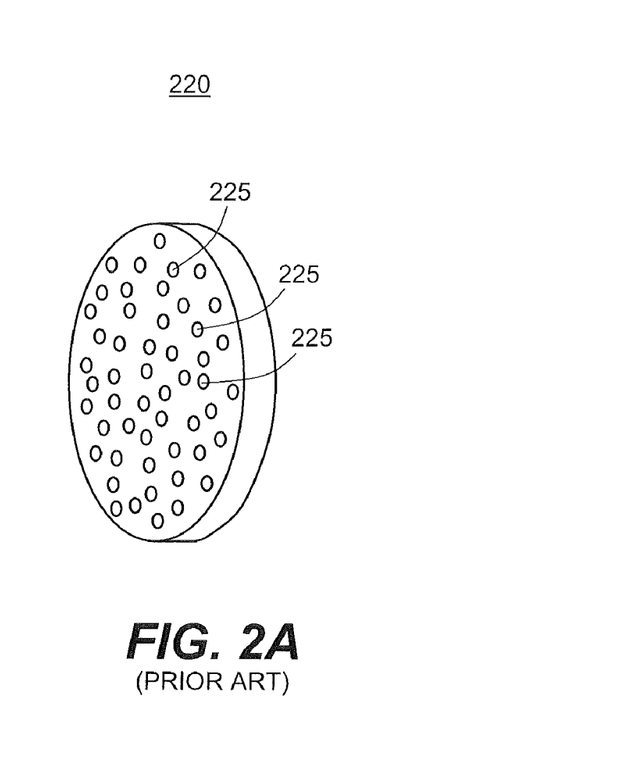
FIG. 2A is an illustration of a prior art non-adjustable phase noise spatial filter.

FIG. 2A show an illustration of a non-adjustable phase noise spatial filter 220 from the prior art. The non-adjustable phase noise filter 220 has phase spots 225 distributed across the front surface. The entire functional area of the non-adjustable phase noise spatial filter 220 is transparent.

Figure 2B:
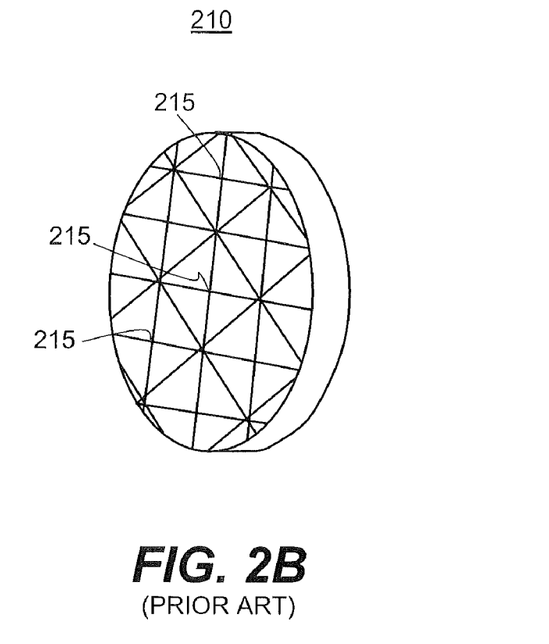
FIG. 2B is an illustration of a prior art non-adjustable pyramidal spatial filter.

FIG. 2B shows an illustration of a non-adjustable pyramidal spatial filter 210 from the prior art. The non-adjustable pyramidal filter 210 has rows of four sided pyramidal shaped features 215. The entire functional area of the non-adjustable pyramidal spatial filter 210 is transparent.

Figure 3A:
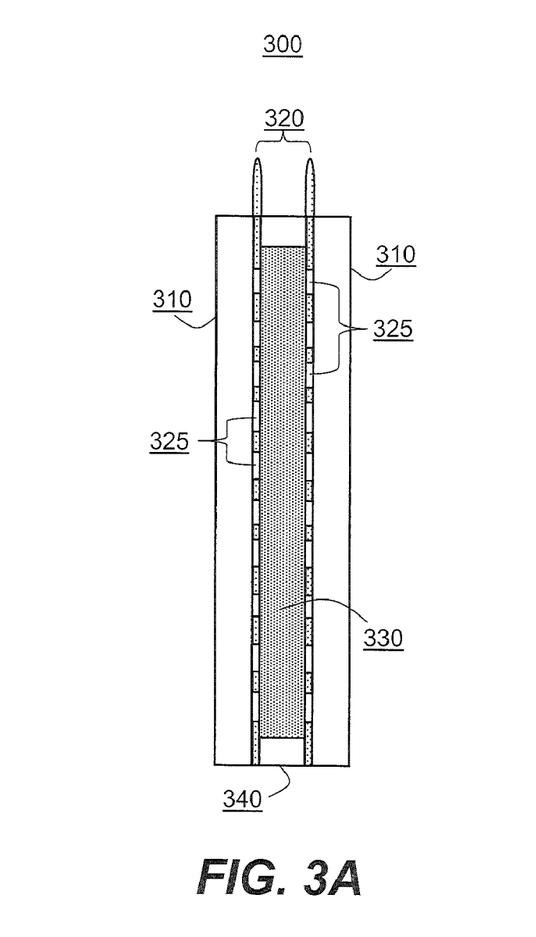
FIGS. 3A and 3B are schematic diagrams of an adjustable phase noise spatial filter in an embodiment of the invention.
Figure 3B:
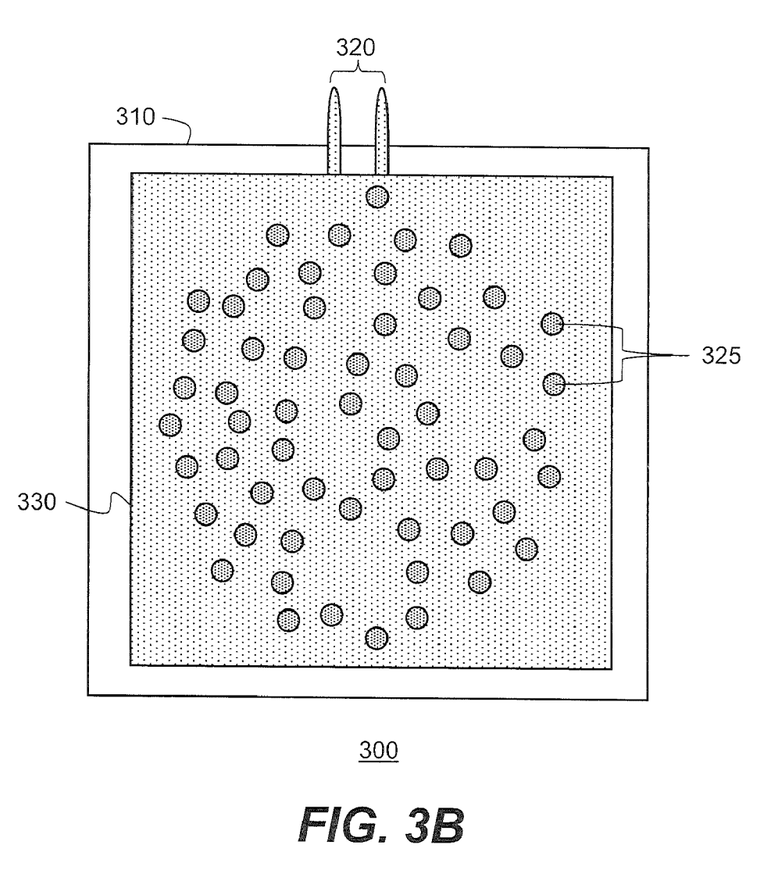
Figure 3C:
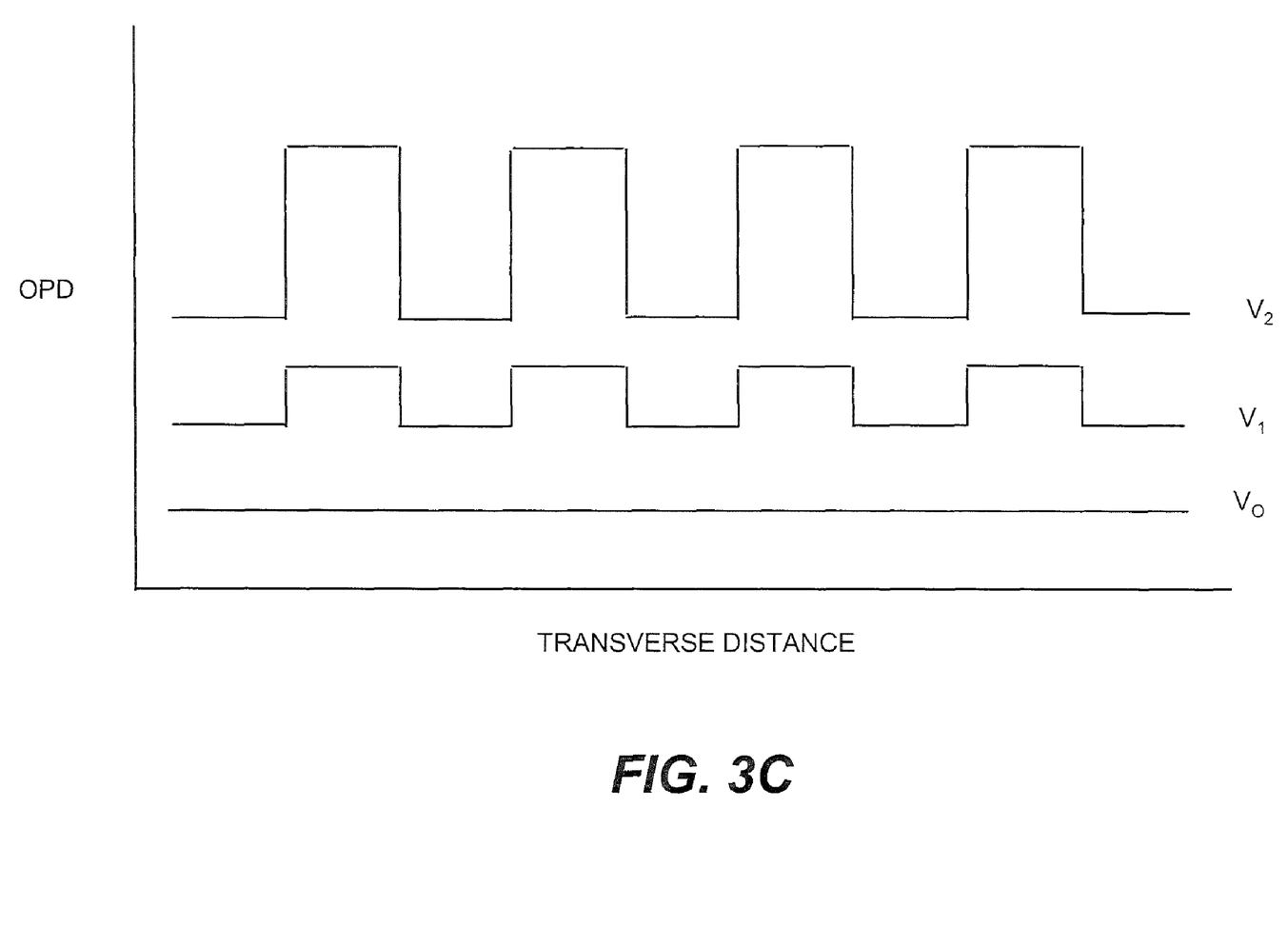
FIG. 3C is a chart showing the OPD in the adjustable phase spots as a function of voltage for an adjustable phase noise spatial filter.

FIGS. 3A and 3B show schematic diagrams of an embodiment of the invention for an adjustable phase noise spatial filter 300. In this embodiment, a liquid crystal material 330 is contained by glass plates 310 and edge seals 340. Very thin transparent electrodes 320 extend across the area of the liquid crystal material 330 and on either side of the liquid crystal material 330. The transparent electrodes 320 have a randomly arranged array of holes 325 that are approximately the size of the phase spots 225 of the prior art. By adding arrays of holes 325 to one or both of the transparent electrodes 320, the electric field produced between the transparent electrodes 320 by an applied voltage between the transparent electrodes 320 is locally decreased in the portions of the liquid crystal material 330 that are located under the holes 325 so that the liquid crystal molecules in these portions become less aligned than the other portions. As a result, the refractive index of the liquid crystal material 330 in the portions of the liquid crystal material 330 that are located under the holes 325 does not increase as much as the other portions thereby producing a local change in the refractive index ($\Delta n$) and an associated local change in the OPD which produces an adjustable optical structure as shown in FIG. 3C where the step changes in OPD act as adjustable phase spots. When 0 voltage ($V_o$) is applied to the transparent electrodes 320, the electric field is the same across the entire area of the liquid crystal material 330. As a result, the OPD is the same everywhere and the adjustable phase spots disappear as shown in FIG. 3C. As the applied voltage is increased, the electric field in the other portions of the liquid crystal material 330 increases while the electric field in the portions of the liquid crystal material 330 that are located under the holes 325 increases much less and consequently, adjustable phase spots with an increasing difference in height are produced by the local change in OPD (as shown for increased voltages $V_1$ and $V_2$ in FIG. 3C), up to the maximum $\Delta n$ possible for the liquid crystal material 330. The adjustable phase noise spatial filter 300 shown in FIGS. 3A and 3B is controlled by electric signals and as such is an electrically controllable adjustable spatial filter. As with the prior art non-adjustable phase noise spatial filter 220, the entire functional area between the edge seals 340 of the adjustable phase noise spatial filter 300 is transparent.

It should also be noted for this embodiment, that the change in OPD needed to produce suitable adjustable phase spots in an adjustable phase noise spatial filter 300 is relatively small, so the liquid crystal material can be very thin (approximately 4 micron) and as a result, the response time to turn the spatial filter ON and OFF can be very fast (approximately 0.002 sec). As previously stated and as can be seen from Equation 3, it is the diameter of the phase spots that determines the resolution that a phase noise filter anti-aliases at, while as seen in Equation 2 the height of the phase spots determines the wavelength of maximum blur. Since the diameter of the adjustable phase spots is not adjustable in the adjustable phase noise spatial filter 300, this type of adjustable spatial filter can be operated in an ON/OFF manner by the controller 30 applying a first electric signal and a second electric signal with different voltages for operation in a high resolution mode and a lower resolution mode respectively. Various different voltages could be applied to the adjustable phase noise spatial filter to produce different effective heights of the optical structure to make it anti-alias at different wavelengths if desired.

It should also be noted that while FIGS. 3A and 3B show a configuration for an adjustable phase noise spatial filter 300 that includes transparent electrodes 320 with an array of holes 325, it is within the scope of the invention that the transparent electrodes 320 in an alternate embodiment, substitute an array of connected dots on the transparent electrodes 320 instead of holes 325. In this embodiment with connected dots on the transparent electrode 320, the changes in OPD that form the adjustable phase spots, are formed in an opposite fashion when voltage is applied to the transparent electrode 320 compared to an embodiment which has holes on the transparent electrode 320. Since the operating principle of a phase noise spatial filter is based on local changes in thickness (or OPD), the phase spots work equally well whether they are increases in thickness (or OPD) or decreases in thickness (or OPD).

As stated previously, the holes 325 (or connected dots) in the transparent electrodes 320 can be in one or both of the transparent electrodes 320. However, any fringing of the electric field at the edges of the holes 325 (or dots) will produce a rounded transition of refractive index, and an associated rounded change in OPD into the adjustable phase spot will be produced. This rounded transition of the refractive index and associated change in OPD in the vicinity of the holes 325 (or dots) in the transparent electrode 320 is more severe for the case when only one of the two transparent electrodes 320 has a hole 325 (or dot). In fact, this rounded transition of refractive index and associated change in OPD produced by fringing of the electric field when one transparent electrode has a hole and one does not, is what produces a liquid crystal lens in the prior art presented by Pishnyak et al. For the case of an adjustable phase spot, rounded transitions into the adjustable phase spot cause light to scatter off the sides of the adjustable phase spot which causes flare in the image thereby degrading the quality of the images produced with the adjustable spatial filter. Consequently, in a preferred embodiment of the invention, both of the transparent electrodes 320 have randomly arranged arrays of holes 325 (or dots) that are aligned with one another on either side of the liquid crystal material 330 as shown in cross section in FIG. 3A.

Figure 4A:
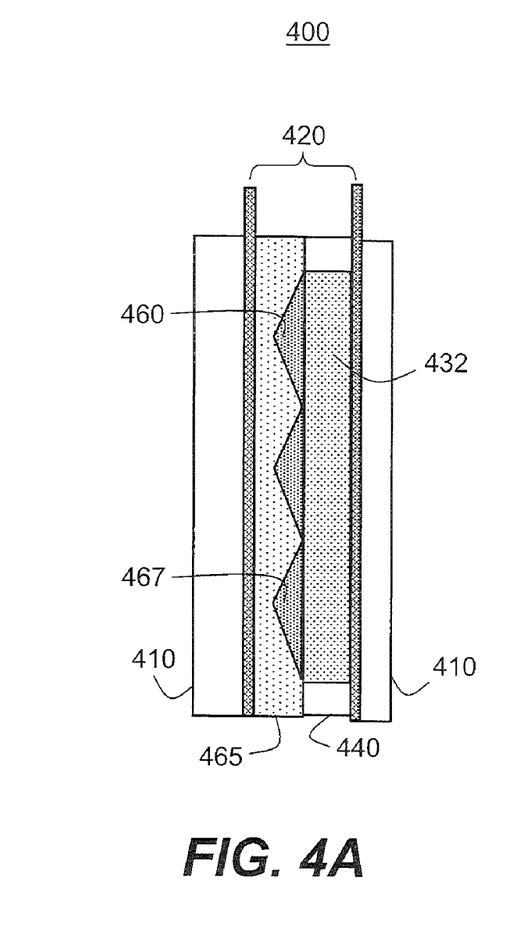
FIGS. 4A and 4B are schematic diagrams of an adjustable pyramid spatial filter in another embodiment of the invention.
Figure 4B:
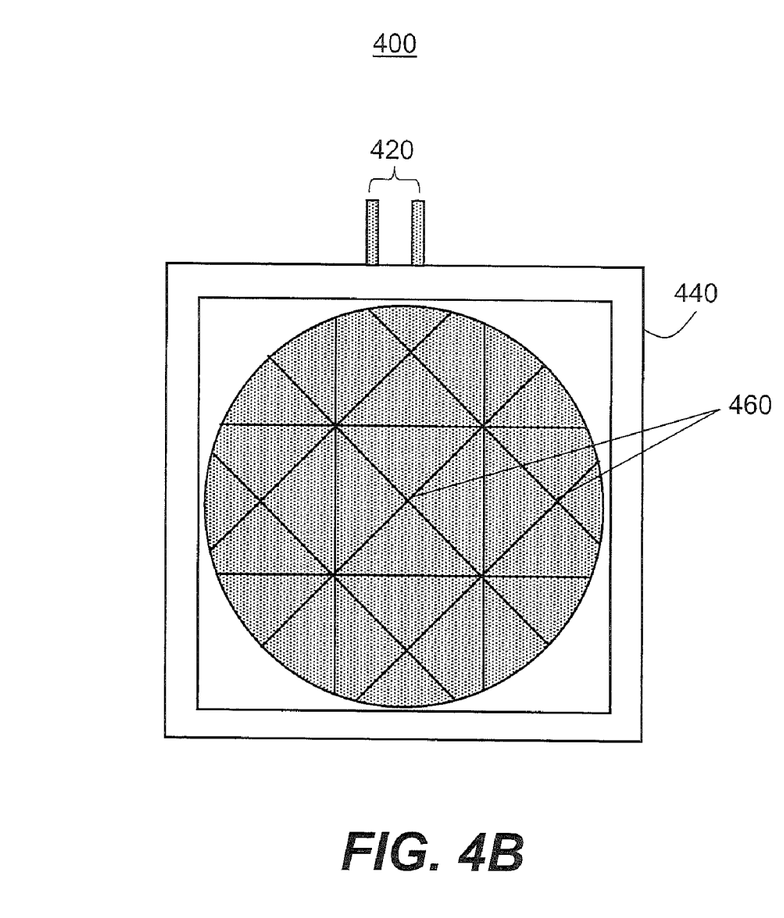
Figure 4C:
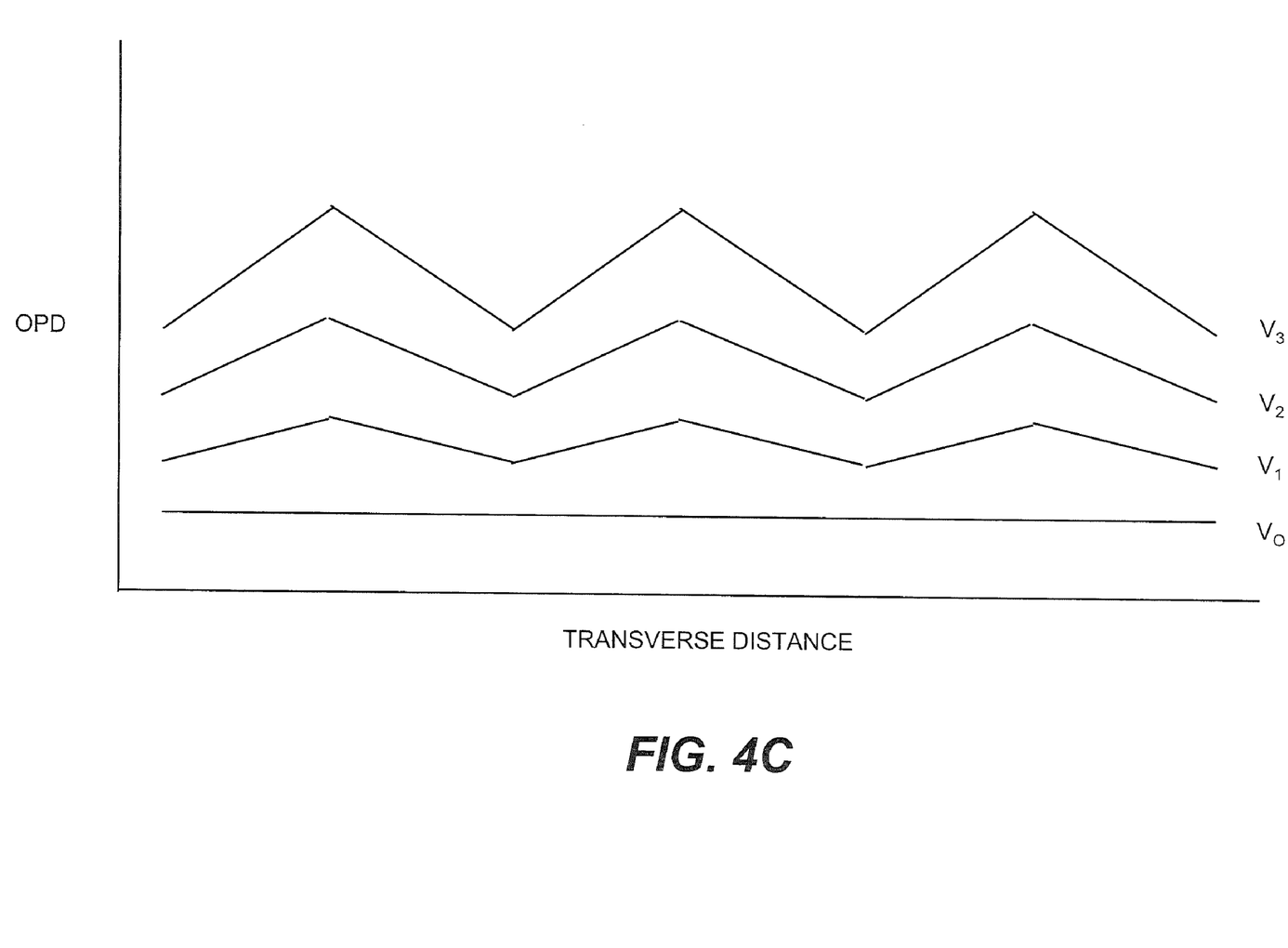
FIG. 4C is a chart showing the OPD in the adjustable pyramids as a function of voltage for an adjustable pyramid spatial filter.

FIGS. 4A and 4B show schematic diagrams of another embodiment of the invention wherein a liquid crystal device is used to produce an adjustable pyramid spatial filter 400. In this case, a layer of liquid crystal material 432 is contained by two layers of glass 410 and edge seals 440. There are two transparent electrodes 420 which substantially cover the entire area of the liquid crystal material 432. In addition, the adjustable spatial filter of this embodiment includes transparent elements in the form of dielectric elements 465 and 467 including dielectric materials which are provided between the transparent electrodes 420 and the liquid crystal material 432. The intersection of the dielectric elements 465 and 467 is shown as the pyramidal shaped dielectric materials interface 460. The dielectric elements 465 and 467 together form a layer of uniform thickness as shown in FIG. 4A. In addition, the dielectric constants of the dielectric layers 465 and 467 are different so that a voltage applied to the transparent electrodes 420 produces a locally varying electric field that produces a locally varying OPD distribution to form an adjustable optical structure with a pyramidal shape as shown in FIG. 4C which forms the adjustable pyramid spatial filter 400. Wherein the magnitude of the OPD distribution in the adjustable pyramid spatial filter 400 depends on both the shape and size of the dielectric layers and the pyramidal shaped dielectric materials interface 460, the difference in the dielectric constants of the dielectric materials 465 and 467 and the magnitude of the voltage applied to the transparent electrodes 420. FIG. 4C shows pyramid shapes produced by differences in OPD for increasing voltages from $V_0=0$, progressively increasing to $V_1$, $V_2$ and $V_3$. Further, the dielectric layers 465 and 467 are transparent and the dielectric materials 465 and 467 have the same refractive index so that the pyramidal shape of the dielectric materials interface 460 is not visually apparent. U.S. Patent Application Publication No. 2007/0229754 describes the use of shaped dielectric materials to produce a lens structure. FIG. 4A shows a cross sectional view of the dielectric materials 465 and 467 with the pyramidal shaped dielectric materials interface 460, while FIG. 4B shows the pyramid shapes of the pyramidal shaped dielectric materials interface 460 over the area of the liquid crystal material 432. With the adjustable pyramid spatial filter 400, applying a voltage between the transparent electrodes 420 causes an adjustable optical structure to be formed that is similar in shape to the non-adjustable pyramid filter 210 of the prior art but the OPD height of the adjustable pyramids is electrically adjustable and electrically controllable in the adjustable pyramid spatial filter 400 of the invention as shown in FIG. 4C. As with the prior art non-adjustable pyramidal spatial filter 210, the entire functional area between the edge seals 440 of the adjustable pyramid spatial filter 400 is transparent.

As previously stated, the angle of the sides of the pyramids in a pyramid spatial filter determines the resolution that the pyramid spatial filter anti-aliasing at. Since the height of the pyramids and as a result, the angle of the sides of the pyramids in an adjustable pyramid spatial filter can be controlled by adjusting the applied voltage (see FIG. 4C), the adjustable pyramid spatial filter 400 can be used for operation of an image capture device in two or more different resolution modes. To operate the adjustable pyramid spatial filter 400 in two or more different resolution modes, two or more different electric signals with different voltages must be applied by the controller 30 to the transparent electrodes 420 of the adjustable pyramid spatial filter 400.

It should be noted that liquid crystal devices are typically polarization sensitive. As a result, a single layer liquid crystal device typically is only effective on light in a single polarization state so that only half of the light is affected. To construct a liquid crystal device which is effective on both polarization states of the light, two layers of liquid crystal are typically used wherein the layers are oriented perpendicular to each other as described in U.S. Pat. No. 4,572,616. The two layers of the liquid crystal devices are typically operated in parallel so that both polarization states of the light are affected equally. Consequently, while the embodiments of the invention shown in FIGS. 3A, 3B, 4A and 4B are shown with one layer of liquid crystal material, the preferred embodiment is to have two layers of liquid crystal material in each case wherein the layers are separated by a glass layer and the layers are oriented perpendicular to each other and the layers are operated together.

Figure 5:
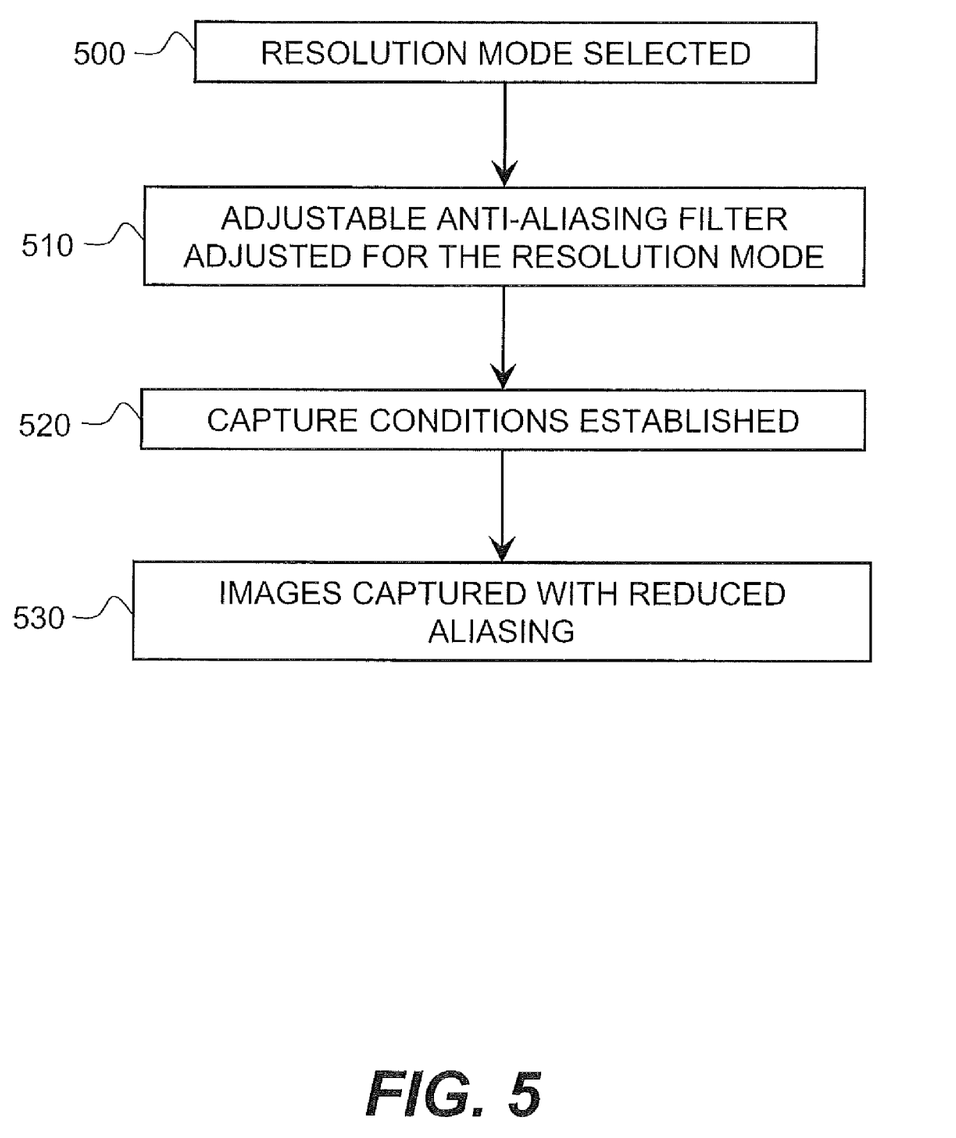
FIG. 5 is a flow chart of the method of using an adjustable spatial filter in an embodiment of the invention.

FIG. 5 shows a flow diagram for the method of the invention. In Step 500 the resolution of the image sensor 50 is selected for the mode of operation. The selection can be made by the user manually selecting a mode through the user interface 55 such as Sports or Portrait or Low Light. Alternately, the image capture device 75 and the associated image processor 60 can automatically select the resolution of the image sensor 50 and any associated mode of operation based on detected photographic conditions in the scene such as light level, motion present, dynamic range, flash and camera motion. In Step 510, the controller 30 operates on inputs from the user interface 55 and the image processor 60 to define the operating mode for the adjustable spatial filter 46 and apply the appropriate signal to the adjustable spatial filter 46 so the adjustable spatial filter 46 is effective at anti-aliasing at the resolution that the image sensor 50 is to be operated at. The capture conditions are then established in Step 520 as appropriate for the selected mode and the photographic conditions in the scene including ISO, lens f#, flash and shutter speed as well as the exposure time. Then in Step 530, images are captured with reduced aliasing wherein the images can be still images or video. The key feature of the method of the invention is that the characteristics of the adjustable spatial filter 46 are adjusted to match the resolution and effective pixel size of the image sensor 50 for the mode that the image capture device 75 will be operated in so that aliasing is reduced in the captured images.

Figure 6:
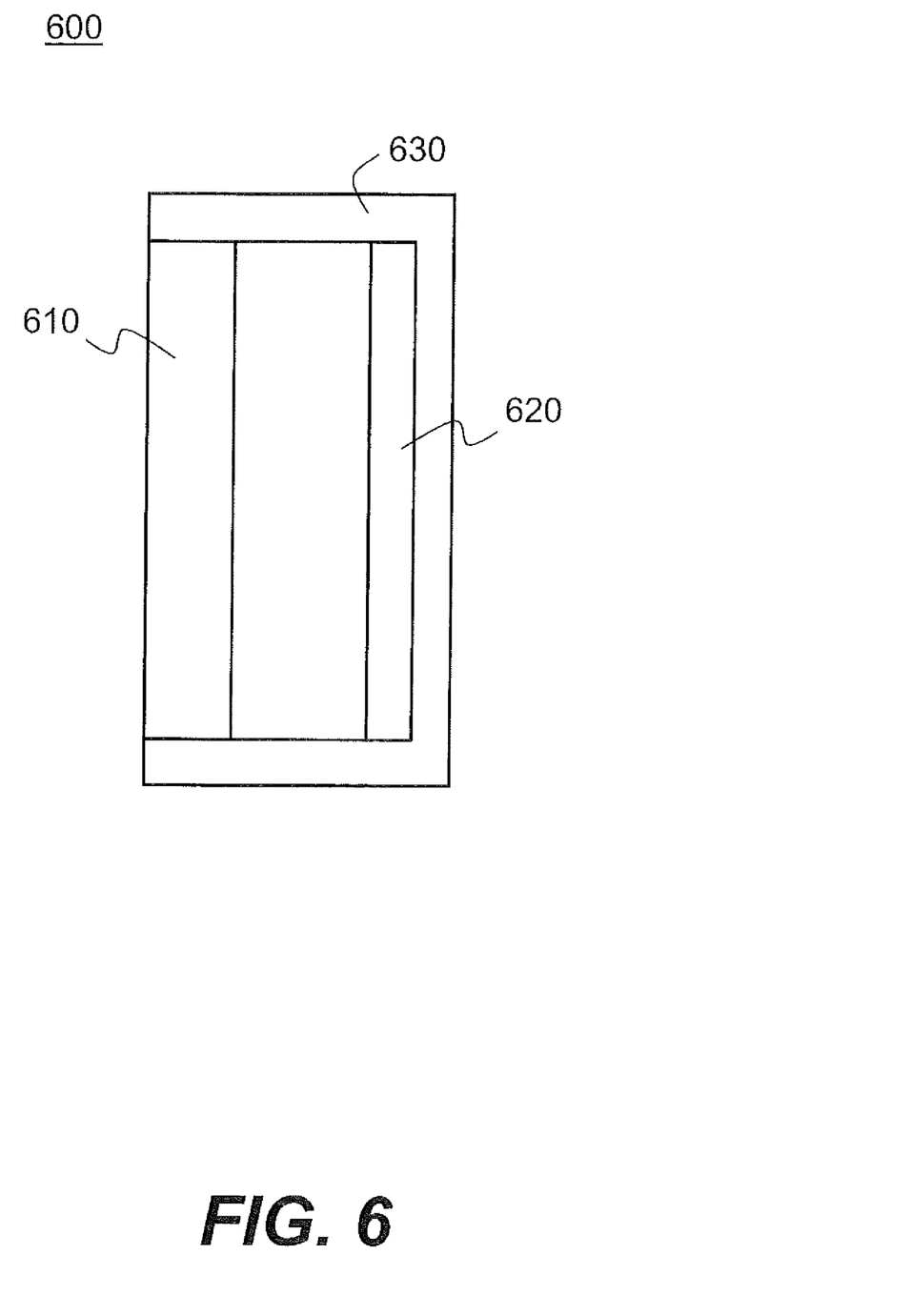
FIG. 6 is a schematic diagram of yet another embodiment of the invention in which an adjustable spatial filter and an image sensor are combined in a sensor module.

FIG. 6 shows a further embodiment of the invention in which an image sensor 620 is combined with an adjustable spatial filter 610 in a sensor module 600. FIG. 6 shows the image sensor 620 and the adjustable spatial filter mounted in a sealed housing 630, but other mounting schemes are possible within the scope of the invention. The sensor module 600 provides an image sensor 620 with an adjustable spatial filter 610 that has been designed to operate at the various resolutions of the image sensor 620. By positioning the adjustable spatial filter over the image sensor 620, the adjustable spatial filter 610 also acts as a cover glass to protect the image sensor 620. By mounting the adjustable spatial filter 610 and the image sensor 620 in the same sealed housing 630, the alignment and spacing between the adjustable spatial filter 610 and the image sensor 620 can be done very accurately and locked in place. This embodiment is particularly advantageous for an adjustable phase noise spatial filter 300 where the diameter of the holes in the transparent electrodes and the associated adjustable phase spots must be designed to match the resolution of the image sensor 620 and the spacing from the spatial filter to the image sensor (see Equations 2 and 3).

The invention has been described in detail with particular reference to certain preferred embodiments thereof, but it will be understood that variations and modifications can be effected within the spirit and scope of the invention. For example, where the present description has been primarily directed to low pass spatial filters for anti-aliasing, other types of low-pass filters could equivalently be used, either in combination with one or more anti-aliasing filters or blur filters in combination with other low-pass filter types. Embodiments of the present invention allow adaptation for sensor arrays of various types that are capable of operating in variable resolution modes. Those skilled in the art will appreciate that monochrome image sensors and image sensors with color filter arrays can practice the present invention. Such image sensors can include pixels with color filters and panchromatic pixels with or without filters.

Those skilled in the art will also appreciate that while the invention has been described with reference to adjustable spatial filters that are operated by electrical signals, the invention is also applicable for use with adjustable spatial filters that are operated by other signals including: pneumatic signals, hydraulic signals, magnetic signals, and mechanical signals.

PARTS LIST

- 30 controller
- 40 optical system
- 42 lens assembly
- 44 focus system
- 46 adjustable spatial filter
- 50 image sensor
- 55 user interface
- 60 image processor
- 65 display
- 70 data storage
- 75 image capture device
- 210 prior art non-adjustable pyramid spatial filter
- 215 pyramidal shaped pleat features
- 220 prior art non-adjustable phase noise spatial filter
- 225 phase spots
- 300 adjustable phase noise spatial filter
- 310 glass sheets
- 320 transparent electrodes
- 325 holes in the transparent electrodes
- 330 liquid crystal material
- 340 edge seals
- 400 adjustable pyramid spatial filter
- 410 glass sheets
- 420 transparent electrodes
- 432 liquid crystal material
- 440 edge seals
- 460 pyramidal shaped dielectric material interface
- 465 dielectric material
- 467 dielectric material
- 500 step
- 510 step
- 520 step
- 530 step
- 600 sensor module
- 610 adjustable spatial filter
- 620 image sensor
- 630 housing

The invention claimed is:

1. A spatial filter system for an image capture device including an image sensor, the imaging capture device having a high resolution mode of operation and one or more lower resolution modes of operation; the filter system comprising:
    an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation, wherein the adjustable spatial filter includes a series of adjustable phase spots, in one or more layers, which change refractive index in response to the applied signal thereby causing the adjustable spatial filter to change its effective mode of operation;
    means for selectively applying the first signal, when the adjustable spatial filter is to be effective in the high resolution mode of operation, and the second signal when the adjustable spatial filter is to be effective in the lower resolution mode of operation; and
    the adjustable spatial filter includes a liquid crystal device having two or more spaced apart transparent electrodes and one or more liquid crystal layers which have predetermined indices of refraction and one or more of the transparent electrodes are configured with a series of connected dots to locally change the refractive index of the associated series of adjustable phase spots in the one or more liquid crystal layers in response to the applied first or second signal.

2. The filter system of claim 1 wherein the modes of operation include still image capture and video.

3. The spatial filter system of claim 1, wherein the adjustable spatial filter is configured in response to the first signal to substantially maintain a point spread function of the lens for high resolution operation and in response to the second applied signal to increase the point spread function of the adjustable spatial filter system for lower resolution operation.

4. A spatial filter system for an image capture device including an image sensor, the imaging capture device having a high resolution mode of operation and one or more lower resolution modes of operation; the filter system comprising:
    an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation, wherein the adjustable spatial filter includes a liquid crystal device having two or more spaced apart transparent electrodes and one or more liquid crystal layers which have predetermined indices of refraction and one or more of the transparent electrodes are configured with a series of holes to locally change the refractive index around the associated series of adjustable phase spots in the one or more liquid crystal layers in response to the applied first or second signal, and
    means for selectively applying the first signal, when the adjustable spatial filter is to be effective in the high resolution mode of operation, and the second signal when the adjustable spatial filter is to be effective in the lower resolution mode of operation.

5. A spatial filter system for an image capture device including an image sensor, the imaging capture device having a high resolution mode of operation and one or more lower resolution modes of operation; the filter system comprising:

an adjustable spatial filter associated with the optical path of the image capture device having an adjustable optical structure which in response to a first signal causes the adjustable spatial filter to be effective in a high resolution mode of operation and in response to a second signal causes the adjustable spatial filter to be effective in a lower resolution mode of operation, wherein the adjustable spatial filter includes transparent elements that produce local changes in refractive index in a pyramidal shape in response to the applied signal thereby causing the adjustable spatial filter to change its effective mode of operation, and the adjustable spatial filter includes a liquid crystal device having two or more spaced apart transparent electrodes and one or more liquid crystal layers which have predetermined indices of refraction and the transparent elements include a series of pyramidal dielectric elements to produce local changes in refractive index in a pyramidal shape in response to the applied signal; and means for selectively applying the first signal, when the adjustable spatial filter is to be effective in the high resolution mode of operation, and the second signal when the adjustable spatial filter is to be effective in the lower resolution mode of operation.

* * * * *